April 6, 1937.  G. W. LAMPMAN  2,076,034
ENGINE MOUNTING
Filed March 29, 1934
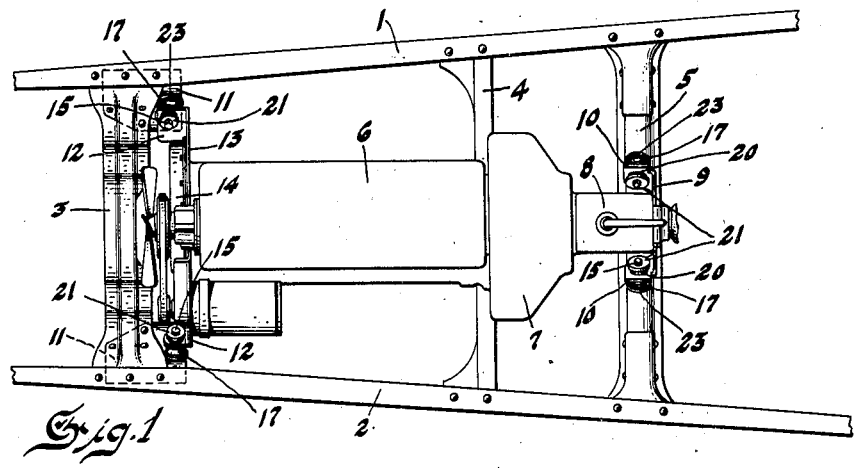
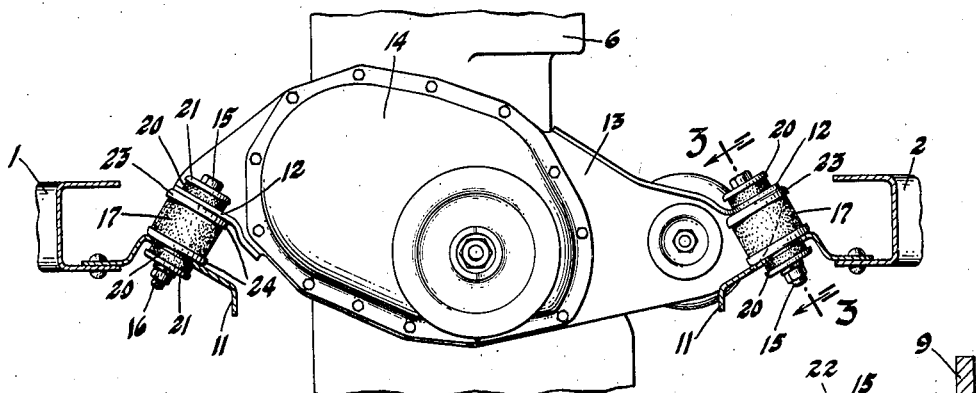
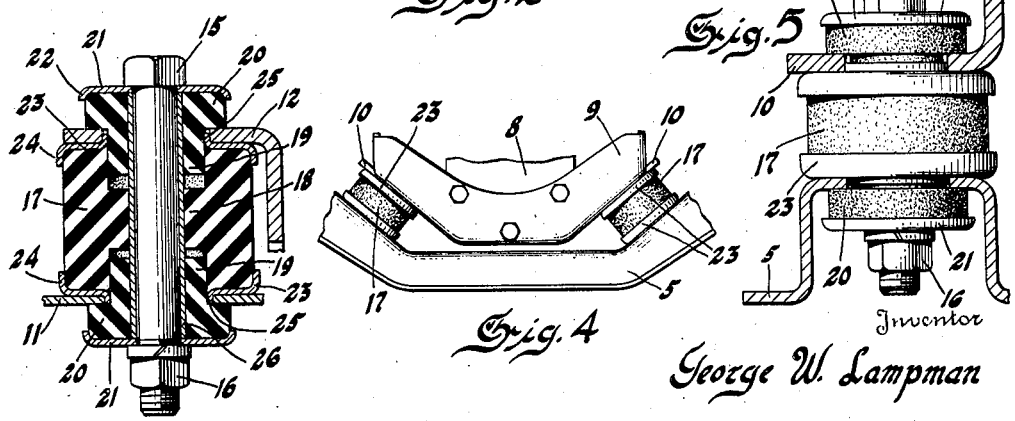
Inventor
George W. Lampman
By Blackmore, Spencer & Flint
Attorneys Patented Apr. 6, 1937

2,076,034

UNITED STATES PATENT OFFICE 2,076,034

ENGINE MOUNTING

George W. Lampman, Pontiac, Mich., assignor to General Motors Corporation, Detroit, Mich., a corporation of Delaware Application March 29, 1934, Serial No. 717,888

6 Claims. (Cl. 248—358)

This invention relates to the resilient support of machinery and particularly to the mounting of an internal combustion engine in the chassis frame of a motor vehicle.

It is an object of the invention to provide a system of suspension whereby the engine is definitely located in its supporting structure but is allowed a slight movement in response to vibratory forces generated as an incident to engine operation.

A further and important object is to provide a resilient anchorage assembly so designed as to have desired deflection characteristics selected and arranged for relative movement of a particular nature dependent upon its point of location and the direction and intensity of the forces to be cushioned.

Other objects and advantages will be readily understood upon reference to the accompanying drawing, wherein Figure 1 is a top plan view of a powder plant mounted in a vehicle chassis frame in accordance with the invention; Figure 2 is an elevation showing the mountings at the front of the engine; Figure 3 is a vertical section taken on line 3—3 of Figure 2; Figure 4 is a fragmentary view showing the mounting at the rear of the power plant; and Figure 5 shows in elevation and on a larger scale one of the rear connections with the parts to be connected in section.

A unit power plant consisting of engine, clutch and transmission, as shown in the drawing, is ordinarily used in motor vehicles and tends to vibrate in operation, the extent and direction of the forces differing under varying conditions of load and speed. Tests indicate that the most objectionable and pronounced movement is in a direction substantially transverse to the chassis frame, sometimes about a vertical axis intermediate the front and rear of the power plant unit at approximately the center of gravity, and sometimes about a longitudinally inclined axis lying considerably above the engine crank shaft at the front and immediately adjacent the axis of the crank shaft at the rear or transmission end of the unit and approximately intersecting the center of gravity of the unit.

It will be understood, of course, that engines of different designs have different vibrational characteristics and that there are a multiplicity of factors which make for complexity of movement, but as a general rule unit power plants of the type here involved have a major side to side thrust at the points most convenient for attachment to the frame. Such points of mounting are on opposite sides of the front of the engine and the rear of the transmission, giving a total of four connections, which for convenience and economy may be all of similar design.

Only the front portion of a motor vehicle chassis frame is shown in the drawing, and this may include a pair of longitudinal channels 1 and 2, connected at suitable intervals by transverse members 3, 4 and 5. The power plant which is to be supported upon the frame includes an engine 6, a bell housing 7 for the clutch, and a gear box 8 for the change speed mechanism. Bolted to the rear face of the transmission casing 8 is a bracket 9, having on opposite sides a pair of lateral flanges 10, which extend divergently in relation to each other for attachment through a resilient assembly to divergently disposed seating portions on the cross member 5. Similar flexible connections are provided at the front of the engine between mounting brackets 11, riveted or otherwise secured to the main framing members and lateral flanges 12 on a mounting plate 13 which may be secured between the timing gear cover 14 and the front face of the engine cylinder block.

Each mounting unit includes in the preferred embodiment illustrated in the drawing a headed stud 15 carrying the threaded nut 16 at one end and extending through enlarged openings in the cooperating engine and frame parts. As best seen in the sectional view in Figure 3, a block or cylinder 17 of rubber or other similar elastic deformable material surrounds the bolt 15 between the frame bracket 11 and the flange 12 of the engine bracket. The opposite end portions of the block 17 are recessed or provided with a counterbore, leaving an interior annular rib 18 which embraces the stud. Extending into each recessed end portion and through the opening in the adjacent bracket member is an extension or skirt 19 of a headed grommet or pad 20 of rubber or the like, which surrounds the stud 15 with its head seating against the outer face of the associated bracket.

For distributing thrust on the rubber pad 20, and providing an armored covering therefor, a sheet metal washer 21 may be carried by the stud and is preferably provided with a peripheral flange 22, affording a recessed seat to receive and locate the resilient insulator. A similar locating plate 23 may be provided for each end of the rubber cylinder 17, with an outturned flange 24 bearing on the outer surface of the rubber cylinder and an inturned pilot flange 25 extending into and fitting the edge of the opening in the adjacent bracket element. In order to space uniformly the end washers 21 in definite relation and automatically afford the proper predetermined compression of the rubber elements, a spacing sleeve or gauge 26 may be fitted to the bolt between the washers 21.

It will be found desirable to make the end recesses in the block 17 deeper than the tubular extensions 19 of the pads 20 so as to leave a clearance space, and a dead air chamber which assists in cushioning relative movement also affords clearance for deformation. By so proportioning the parts that the extensions 19 tightly fit into the recessed ends, the several rubber parts will in the assembled connection assist each other in the cushioning action and through slippage on one another afford an additional damping effect.

Any reasonable degree of relative movement may be provided by preselection of the size and softness of the rubber of the cylinder 17 which carries the load and by its resiliency allows relative movement between the engine and frame. As will be readily apparent the resilient connection affords a greater latitude of movement in a direction transverse to the axis of the fastening stud and in view thereof it is proposed that the studs in the several units extend substantially at right angles to the direction of major thrust. With this in mind the several units are shown in the drawing slightly inclined to the vertical, which is a compromise position selected to take care of the transverse movements to best advantage, with the axis of the stud extending substantially radial from a point slightly above the longitudinally inclined axis so as to accommodate vibrations about both the longitudinal and vertical axes before mentioned. It is to be noted that the rubber blocks at the rear are of less height than those at the front, inasmuch as the rear connections are closer to the point of neutral vibration and have less movement to accommodate.

From the above description it will be apparent that a simple and inexpensive mounting connection is provided, involving locating parts in the form of insulating members associated with an anchoring stud, which affords through deformation of the insulation, a yielding resistance to movement of the parts to be connected, the resistance to movement axially of the stud being greater than that offered to transverse forces which tend to rock and laterally displace the stud and in which the degree of movement allowed may be governed beforehand by the proper selection of the main load supporting block according to its ratio of height to thickness and other deflectional characteristics. In this connection it is to be noted also that the relation between the enlarged openings in the members to be connected and the main weight supporting block with its recessed ends alined with the openings affords an arrangement whereby the load is transmitted through the peripheral portion of the cylinder spaced from the central stud by the medially disposed internal rib, which is substantially free of gravity load and, therefore, less resistant to lateral deformation.

While reference has been made wholly to cushioning vibrations incident to engine operation the mounting units are intended and serve also to eliminate the imposition on the power plant of road shocks and vibrations which come through the wheels and springs to the chassis frame. It will be understood also that the disposition of the axis of each mounting unit at right angles to the direction of major thrust, as specifically disclosed herein, is preferred, but not essential, since the parts are designed to give satisfactory results even though the particular relation specified is not maintained.

I claim:

1. The combination with a supporting member and a supported member, of a resilient mounting therebetween including a central fastening element passing through enlarged openings in said member, a rubber cylinder interposed between said members and provided medially thereof with an inwardly projecting rib fitting said element, locating means for opposite ends of the cylinder, each comprising a peripherally flanged plate receiving an end portion of a cylinder and having an outturned central flange projecting into and fitting the edge of the opening in an adjacent member and rubber washers seating on the outer faces of said members and having extensions projecting through said openings and into the cylinder toward said medial rib.

2. The combination with a supporting member and a member to be supported, of a resilient mounting connection including a fastening pin extending loosely through openings in the respective members, a cylinder of resilient rubber surrounding the pin between said members and having counterbore recesses in opposite ends, retaining seats associated with the adjacent faces of the respective members for the ends of said cylinder, and a pair of headed collars of resilient rubber on opposite ends of the pin projecting through the openings in the members and into the recessed ends of the cylinders with their headed portions bearing on the remote faces of the members.

3. The combination with a supporting member and a member to be supported, of a resilient mounting connection including a fastening pin extending loosely through openings in the respective members, a cylinder of rubber surrounding the pin between said members and having counterbore recesses in opposite ends, retaining seats associated with the adjacent faces of the respective members for the ends of said cylinder, and a pair of headed collars of rubber on opposite ends of the pin projecting through the openings in the members and into the recessed ends of the cylinders with their headed portions bearing on the remote faces of the members, together with spaced seats for said collars and a spacer sleeve on said pin for said seats.

4. In combination with two members to be connected, a resilient joint therebetween, including an attachment element passing loosely through enlarged openings in the respective members, a rubber block surrounding said element with portions thereof beyond said openings extending between and bearing on the adjacent faces of the members, a relatively narrow internal rib projecting inwardly into close fitting engagement with said attachment element intermediate the ends of the block and affording recesses in opposite ends of the block and rubber collars carried by said attachment element in engagement with the remote faces of said members and projected through said enlarged openings and into said recesses into interlocking relation with the ends of said block beyond the intermediate rib.

5. In an engine power plant mounting for a motor vehicle having a frame, a bracket carried by said power plant, a rubber block fitted between said bracket and frame and having end recesses, rubber thimbles, respectively, carried by said bracket and frame and seated in the recesses carried by said block to position said block, and fastening means extending through and engaging said block and thimbles to hold same together in nested position.

6. In an engine power plant mounting for a motor vehicle having a frame, a bracket carried by said power plant, a rubber block fitted between said bracket and frame and having end recesses opening outwardly towards said frame and bracket, respectively, said bracket and frame having openings, respectively, arranged in substantial registration with said recesses, rubber thimbles seated externally of said bracket and frame, said thimbles each having extensions extending through said openings and engaging in said recesses, and fastening means engaging the thimbles and block and clamping said thimbles to said block in nested position.

GEORGE W. LAMPMAN.